US010662845B2

(12) United States Patent
Crawford et al.

(10) Patent No.: US 10,662,845 B2
(45) Date of Patent: *May 26, 2020

(54) EMISSION CONTROL SYSTEM WITH LOCATION CONTROLLED INDUCTION HEATING AND METHODS FOR USE THEREWITH

(71) Applicant: Advanced Technology Emission Solutions Inc., Toronto (CA)

(72) Inventors: Robin Crawford, Carlisle (CA); John Douglas, Brantford (CA)

(73) Assignee: Advanced Technology Emission Solutions Inc., Toronto (CA)

(*) Notice: Subject to any disclaimer, the term of this patent is extended or adjusted under 35 U.S.C. 154(b) by 36 days.

This patent is subject to a terminal disclaimer.

(21) Appl. No.: 16/190,271

(22) Filed: Nov. 14, 2018

(65) Prior Publication Data
US 2019/0078483 A1 Mar. 14, 2019

Related U.S. Application Data

(63) Continuation-in-part of application No. 15/343,533, filed on Nov. 4, 2016, now Pat. No. 10,267,193.
(Continued)

(51) Int. Cl.
F01N 3/02 (2006.01)
F01N 3/10 (2006.01)
(Continued)

(52) U.S. Cl.
CPC ........ F01N 3/2013 (2013.01); B01D 53/9495 (2013.01); F01N 3/021 (2013.01);
(Continued)

(58) Field of Classification Search
CPC ...... F01N 3/021; F01N 3/2013; F01N 3/2828; F01N 9/00; F01N 2510/06; F01N 2900/0602; B01D 53/9495; H05B 6/108
USPC ............... 60/295, 297, 311; 55/282.2, 282.3, 55/385.3, 428.1, 523, DIG. 10, DIG. 30; 95/283
See application file for complete search history.

(56) References Cited

U.S. PATENT DOCUMENTS 4,829,766 A * 5/1989 Henkel .............. B01D 46/0012
60/311
2015/0089924 A1 4/2015 Ogawa
(Continued)

FOREIGN PATENT DOCUMENTS

EP 3151633 B1 9/2018
JP 2016145533 8/2016

OTHER PUBLICATIONS

Extended European Search Report, EP Application No. 18210465.3; dated Apr. 23, 2019; 7 pages.

Primary Examiner — Thai Ba Trieu
Assistant Examiner — Dapinder Singh
(74) Attorney, Agent, or Firm — Garlick & Markison; Bruce E. Stuckman

(57) ABSTRACT

In various embodiments, an electromagnetic field generator generates one or more power signals applied to one or more coils to cause the induction heating of the pins of the emission control device, The pins can have a plurality of differing lengths, and the heating of the pins can cause a first region of the emission control device to heat faster than a second region of the emission control device.

13 Claims, 13 Drawing Sheets

Related U.S. Application Data

(60) Provisional application No. 62/594,821, filed on Dec. 5, 2017, provisional application No. 62/258,071, filed on Nov. 20, 2015.

(51) Int. Cl.
  *F01N 3/20* (2006.01)
  *F01N 9/00* (2006.01)
  *B01D 53/94* (2006.01)
  *F01N 3/021* (2006.01)
  *H05B 6/10* (2006.01)
  *F01N 3/28* (2006.01)

(52) U.S. Cl.
  CPC ............ *F01N 3/2828* (2013.01); *F01N 9/00* (2013.01); *H05B 6/108* (2013.01); *F01N 2510/06* (2013.01); *F01N 2900/0602* (2013.01)

(56) References Cited

U.S. PATENT DOCUMENTS

| | | |
|---|---|---|
| 2017/0218823 A1 | 8/2017 | Crawford |
| 2017/0226907 A1 | 8/2017 | Crawford et al. |

\* cited by examiner

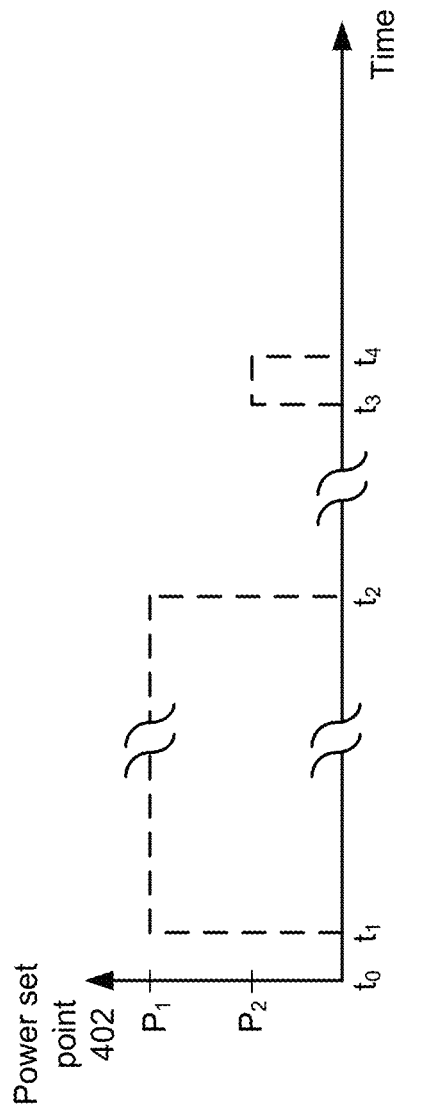
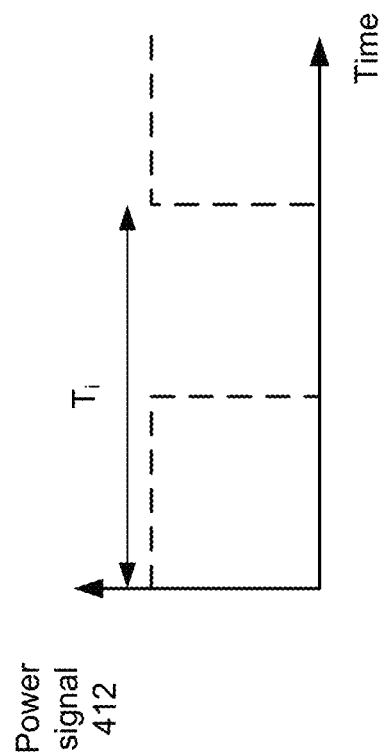

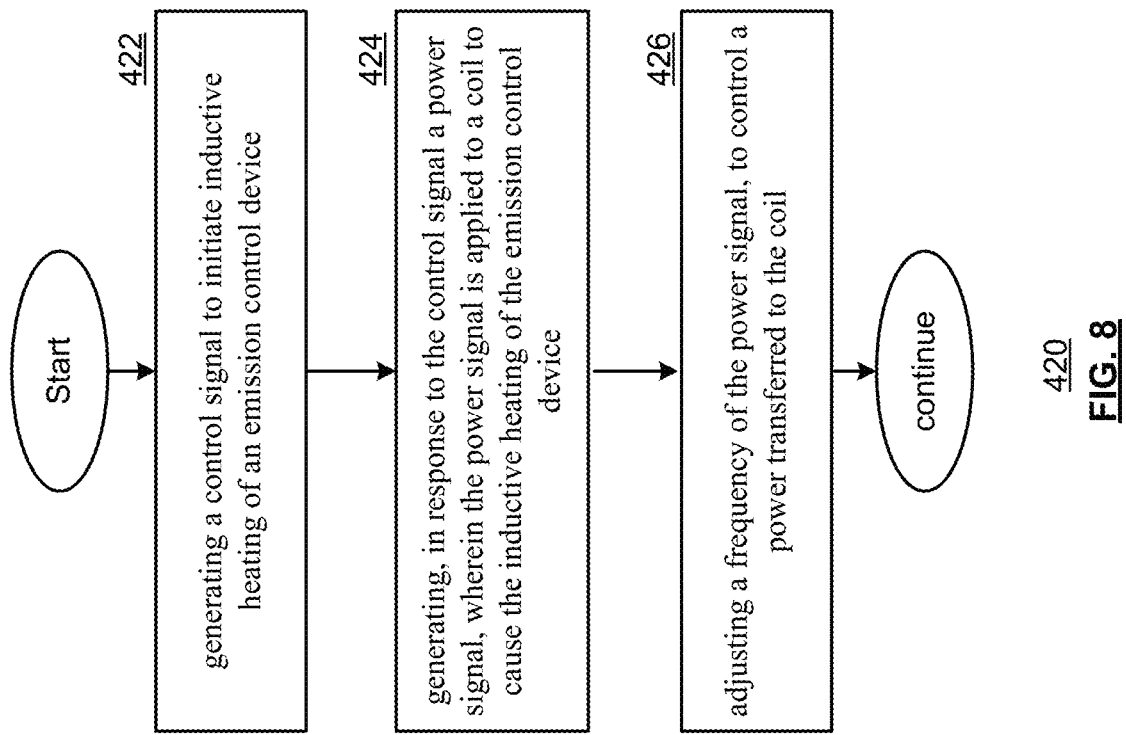

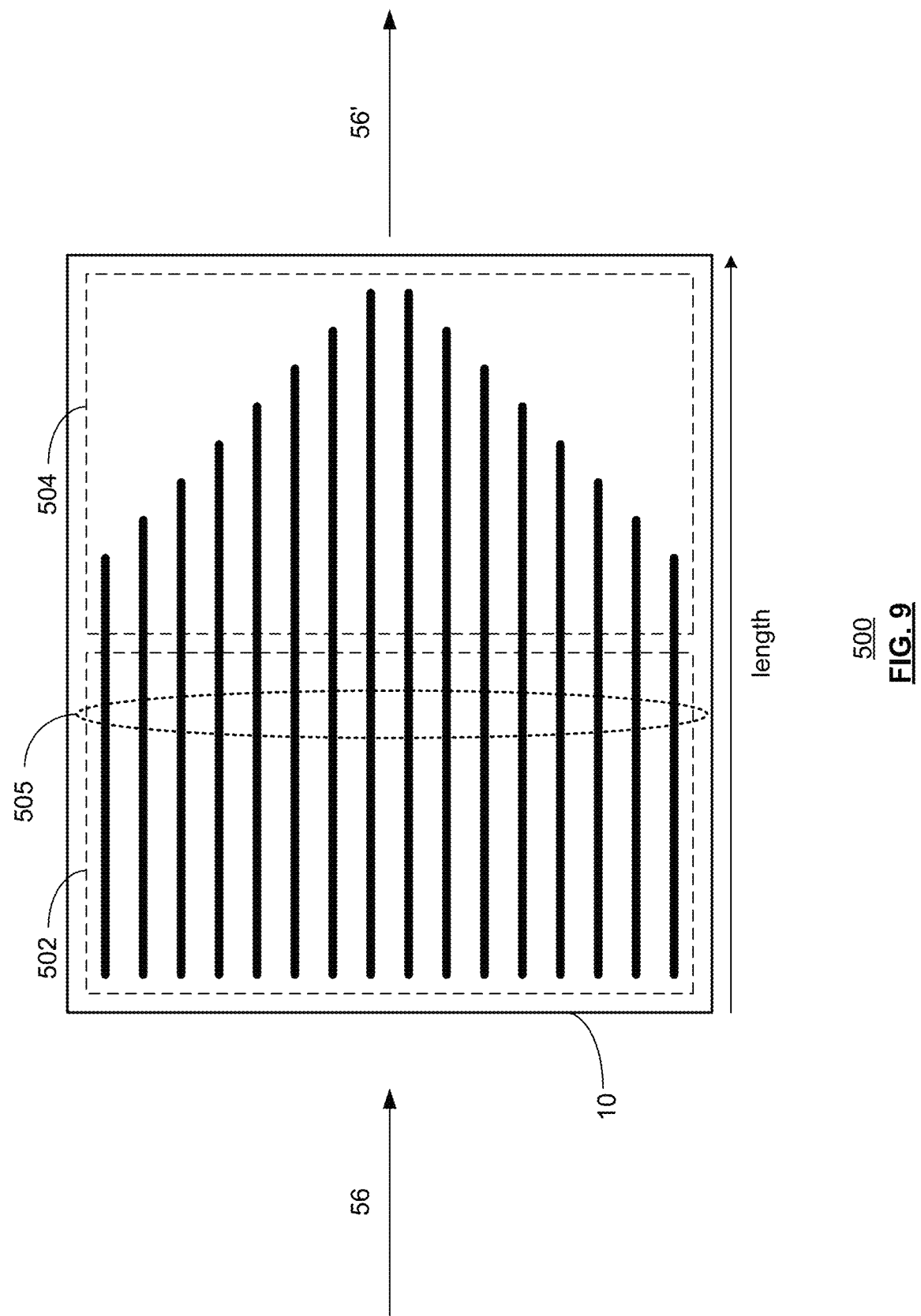

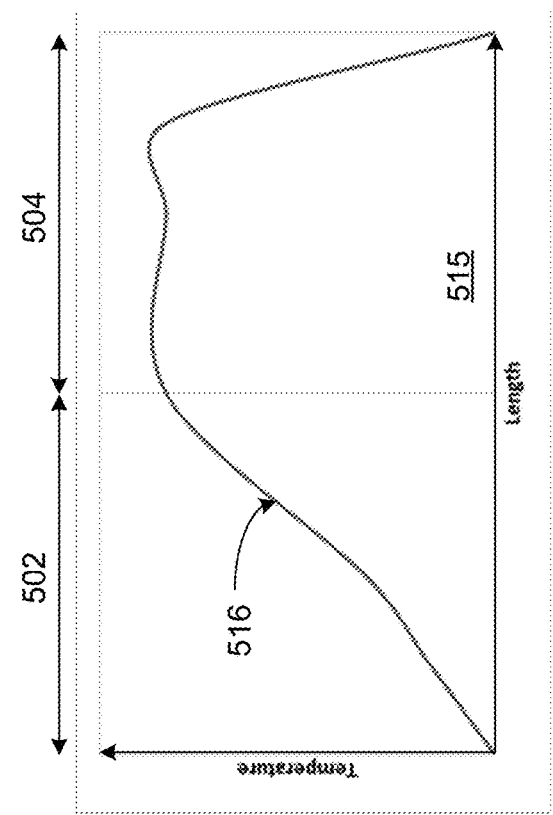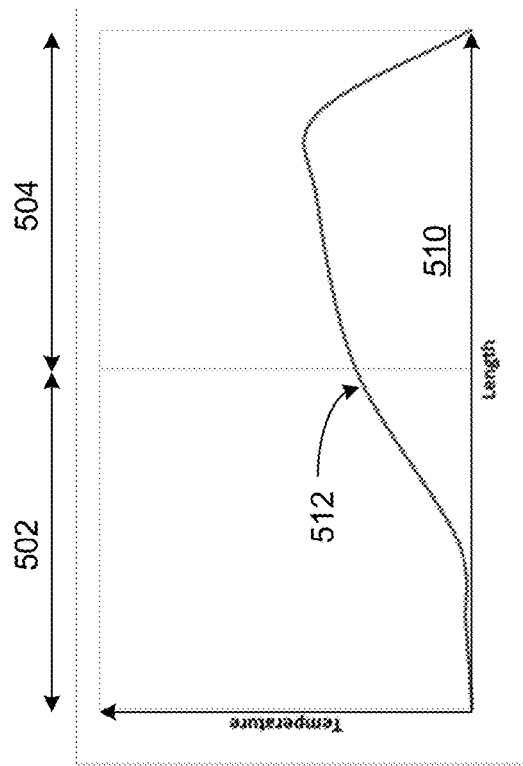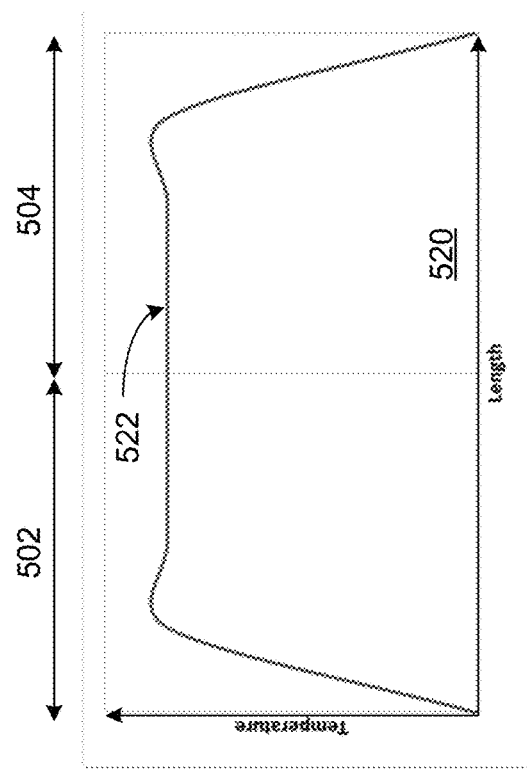
FIG. 10

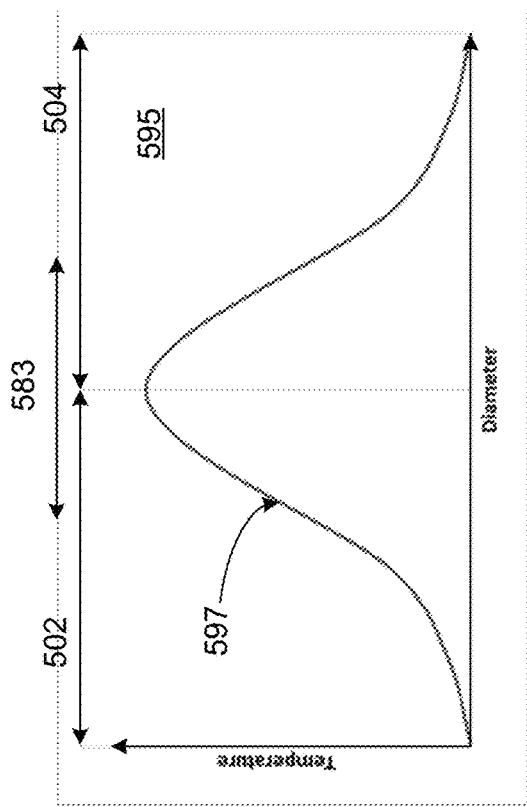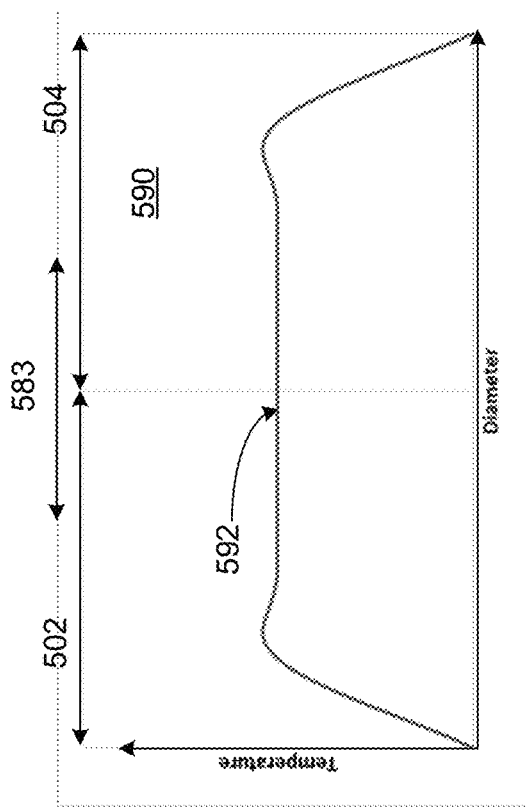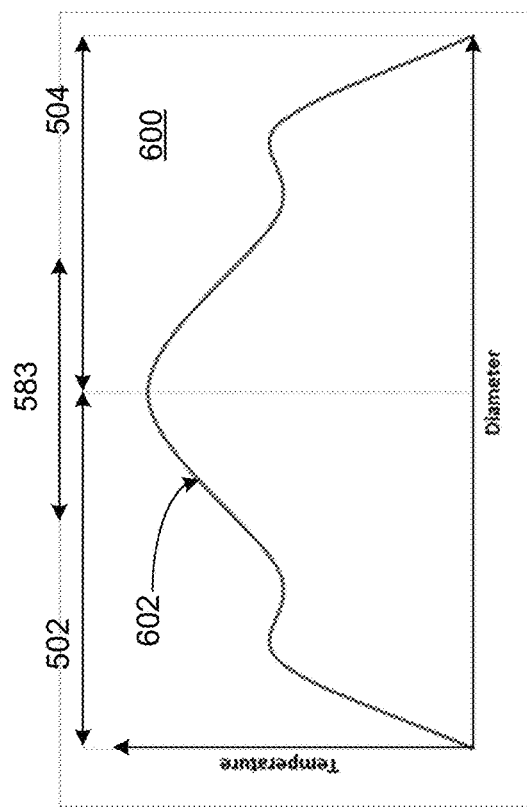
FIG. 15

US 10,662,845 B2

EMISSION CONTROL SYSTEM WITH LOCATION CONTROLLED INDUCTION HEATING AND METHODS FOR USE THEREWITH

CROSS REFERENCE TO RELATED APPLICATIONS

The present U.S. Utility Patent Application claims priority pursuant to 35 U.S.C. § 119(e) to U.S. Provisional Application No. 62/594,821, entitled "EMISSION CONTROL SYSTEM WITH FREQUENCY CONTROLLED INDUCTION HEATING AND METHODS FOR USE THEREWITH", filed Dec. 5, 2017, which is hereby incorporated herein by reference in its entirety and made part of the present U.S. Utility Patent Application for all purposes.

The present U.S. Utility Application No. also claims priority pursuant to 35 U.S.C. § 120 as a continuation-in-part of U.S. Utility application Ser. No. 15/343,533, entitled "EMISSION CONTROL SYSTEM WITH CONTROLLED INDUCTION HEATING AND METHODS FOR USE THEREWITH", filed Nov. 4, 2016, which claims priority pursuant to 35 U.S.C. § 119(e) to U.S. Provisional Application No. 62/258,071, entitled "CATALYTIC CONVERTER SYSTEM WITH CONTROLLED INDUCTION HEATING AND METHODS FOR USE THEREWITH", filed Nov. 20, 2015.

FIELD OF THE DISCLOSURE

This disclosure relates to a structures and methods of operation of emission control systems for treating vehicle exhaust gases.

BRIEF DESCRIPTION OF THE DRAWINGS

For simplicity and clarity of illustration, elements illustrated in the accompanying figure are not drawn to common scale. For example, the dimensions of some of the elements are exaggerated relative to other elements for clarity. Advantages, features and characteristics of the present disclosure, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 6 is a graphical diagram of a control set point as a function of time according to an embodiment of the disclosure.

FIG. 7 is a graphical diagram of a power signal as a function of time according to an embodiment of the disclosure.

FIG. 8 is a flow diagram of a method according to an embodiment of the disclosure.

FIG. 9 is a cross-sectional view of a substrate according to an embodiment of the disclosure.

FIG. 10 is graphical diagrams of several temperature profiles according to an embodiment of the disclosure.

FIG. 15 is graphical diagrams of several temperature profiles according to an embodiment of the disclosure.

DETAILED DESCRIPTION

Figure 1:
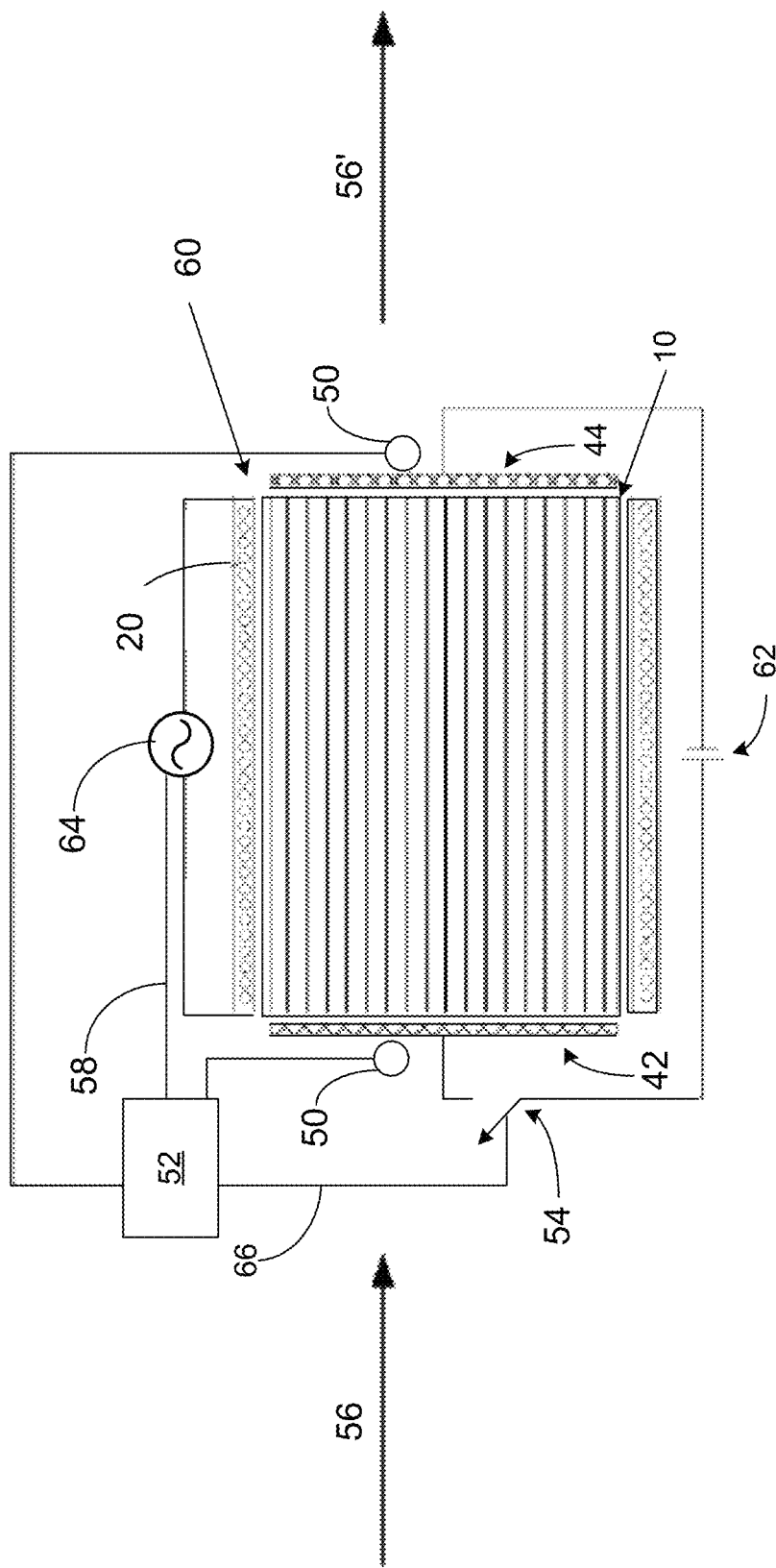
FIG. 1 is a schematic view of an emission control system according to an embodiment of the disclosure.

FIG. 1 is a schematic view of an emission control system according to an embodiment of the disclosure. The emission control system 75 includes a catalytic converter 60 having a plurality of passages in a substrate 10 to facilitate at least one catalytic reaction in an exhaust gas 56 from a vehicle engine, generating processed exhaust gas 56'. The catalytic converter 60 may take any of a number of forms. Typical of these is a converter having a cylindrical substrate of ceramic material. The substrate 10 can have a honeycomb structure in which a number of small area passages or cells extend the length of the substrate, the passages being separated by walls. There are typically from 400 to 900 cells per square inch of cross-sectional area of the substrate unit and the walls are typically in the range 0.002 to 0.008 inches in thickness. The substrate 10 can be formed in an extrusion process in which green ceramic material is extruded through an appropriately shaped die and units are cut successively from the extrusion, the units being then cut into substrates which are shorter than a unit. The areal shape of the passages or cells may be whatever is convenient for contributing to the overall strength of the substrate 10 while presenting a large contact area at which flowing exhaust gases can interact with a hot catalyst coating the interior cell walls. In addition to the ceramic material, the substrate 10 can be embedded with, or otherwise include, a plurality of metal pins or other metal elements that facilitate induction heating of the catalytic converter 60.

The interiors of the tubular passages in the substrate 10 can be wash-coated with a layer containing the particular catalyst material. These tubular passages can have a circular or elliptical cross-section, a rectangular, square or other polygonal cross section or other cross section. A suitable wash-coat can contain a base material, suitable for ensuring adherence to the cured ceramic material of the substrate, and entrained catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen, however other catalysts can also be employed to promote high temperature oxidation or reduction of other gaseous materials. The wash-coating can be prepared by generating a suspension of the finely divided catalyst in a ceramic paste or slurry, the ceramic slurry serving to cause the wash-coat layer to adhere to the walls of the ceramic substrate. As an alternative to wash-coating to place catalyst materials on the substrate surfaces, the substrate material itself may contain a catalyst assembly so that the extrusion presents catalyst material at the internal surfaces bounding the substrate passages or cells.

One or more temperature sensors 50 are coupled to the catalytic converter 60 to generate temperature signals indicating at least one temperature of the catalytic converter. The temperature sensors 50 can be implemented via thermocouples, thermistors or other thermal sensors that mounted on or in the catalytic converter in order to monitor the temperature at different locations on or in the converter or via other temperature monitors.

Outputs from the temperature sensors 50 are taken to a controller 52 at which the monitored temperature or temperatures are used to control the induction heating via control of an AC generator such as AC source 64. The controller 52 generates a control signal 58 based on the temperature(s) indicated by these temperature signals. At least one electromagnetic field generator including AC source 64 and coil 20 responds to the control signal 58 by generating an electromagnetic field to inductively to heat the catalytic converter 60. The AC source 64 can, for example, be a variable AC generator that generates an AC signal (or "power signal") having a magnitude, duty cycle or power that varies as a function of the control signal 58. In another example, the control signal 58 turns the AC source 64 on and off with a duty cycle that varies as a function of the magnitude of the desired level of heating. The AC source can generate a power signal such as a 50 Hz or 60 Hz signal however medium frequency signals in the range 1 kHz-100 kHz and radio frequency signals in the range of 100 kHz-10 MHz or higher frequencies can likewise be employed.

Consider an example where the catalytic converter 60 is implemented via a bolt-in assembly in a vehicle to treat internal combustion engine emissions. Platinum group metals or other catalysts in the wash-coating work in combination with heat to treat the majority of pollutants in the exhaust gas. The catalytic treatment can be heavily dependent on temperature. For the process to be effective, a minimum light-off temperature of about 300 C may need to be reached and maintained. The exhaust gas treatment process may rapidly drop in efficiency below this temperature. In normal engine operation, there are several instances where the temperature of the catalytic converter 60 can be below this threshold: cold start, cool down and start-stop hybrid vehicle operation as well as other electric vehicles with internal combustion engines.

In a cold start condition, the engine and exhaust system are at ambient temperature. In really cold environments, this temperature can be as low as −30 C on a regular basis in winter. Consequently, it can take several minutes of engine operation before the engine and catalytic converters heat up to the required temperature. In fact, there is little to no emissions treatment until the system gets up to the threshold temperature, typically referred to as "light-off". Conventional catalytic converters are solely reliant on the engine for heat to raise their temperature.

Cool down occurs when the engine and exhaust system start out hot and then the temperature drops below the threshold point. Excessive idling after the engine is hot can produce this effect. A low engine RPM will not produce enough exhaust heat to keep the catalytic converter 60 hot. The gradual cooling may result in a steady-state temperature that is below the light-off temperature. Decelerating from high speed can also produce this effect. The engine RPM drops to close to idling levels because no power is required and, as in the case of idling, there is not enough heat generated by vehicle exhaust to keep the catalytic converter 60 hot. Also, there is a large amount of convection under the vehicle that robs heat from the engine and catalytic converter, thus adding to the cooling rate.

In start-stop hybrid vehicle operation, the vehicle engine can be automatically turned-off and restarted during vehicle operation. In mild hybrid vehicles, the vehicle engine is stopped by the engine control module to avoid idling when a vehicle is at rest, such as when a vehicle is stopped in traffic. When the driver removes his/her foot from the brake and engages the accelerator to resume motion, the engine control module quickly restarts the engine in as little as 200 milliseconds. In hybrid electric vehicles, the internal combustion engine can be turned-off for more extended periods and used only when necessary to supplement the operation of one or more electric motors that operate via battery power. Similar to the cold-start and cool-down conditions previously described, the catalytic converter 60 may be at ambient temperature or otherwise lower than light-off temperature.

The emission control system 75 can be further adapted for electrohydrodynamic (EHD) heat and mass transfer of exhaust gas passing through the passages or cells of a catalytic converter substrate 10. In the EHD process, free electrons are generated and caused to migrate from a charged upstream emitter 42 to a grounded downstream collector 44. In the course of their migration, electrons collide with molecules in the exhaust gas, transferring momentum to the gas molecules and causing turbulence in the gas flow. This means that there is a lesser tendency for the gas flow through the cells to adopt a laminar flow and/or there is a tendency for a laminar gas flow to depart from laminarity. Both tendencies bring more exhaust gas into contact with the walls of the converter substrate cell walls than would be the case without EHD stimulation. This results in both an increase in heat transfer between the exhaust gas and the walls of the substrate and an increase in the catalytic pollution-reducing reactions owing to increased contact of the exhaust gas with hot catalyst at the interior surfaces of the substrate cell walls.

In operation, in the period between start-up and light-off, the substrate walls are at a lower temperature than the exhaust gas. More heat is transferred from the flowing exhaust gas to the substrate 10 by stimulation of EHD heat transfer stimulation and the substrate temperature increases at a faster rate than would be the case without the EHD heating process. A control circuit operates under control of controller 52 and includes a first temperature sensor 50 to monitor the temperature of the substrate 10 and a second temperature sensor 50 to monitor the temperature of the exhaust gas immediately upstream of the converter. The controller 52 measures the difference between the exhaust gas and the substrate temperatures and a switch controlled by the controller 52 is used to switch on EHD voltage to the emitter. Greater speed to light-off is obtained by switching in the EHD heat transfer process to stimulate heat transfer from the exhaust gas during the start-up to light-off period. Later, when the substrate 10 is sufficiently hot to cause the pollution reducing catalytic reaction to occur, EHD heat transfer stimulation can be switched off by the controller 52.

In addition, during idling periods, the temperature of the exhaust gas entering the converter may start to drop and a situation may arise where the catalytic converter substrate walls are still at an optimal temperature for catalyst reactions, but the gas entering the converter is below a temperature that it is optimal for such reactions. During the idling phases, the converter may remain at or near an optimal operating temperature from the viewpoint of reducing harmful emissions, even as the gas flowing through the converter is cooling down. In such periods, low power heating of the cooling exhaust gas is obtained by switching in the EHD heat transfer process to draw heat for a limited period of time. Later, when the vehicle is no longer idling and the exhaust gas temperature increases past the monitored substrate temperature, the EHD heat transfer stimulation can be switched off.

The induction heating and EHD heat/mass transfer processes can enhance the performance of the emissions treatment by the catalytic converter system 75 under normal driving conditions including cold starts and cool down, etc. and otherwise improve emissions treatment of exhaust gas 56 by the catalytic converter 60. Control operations can include, but are not limited to:

(a) Pre-heat—heat catalytic converter before engine starts;
(b) Post-heat—heat catalytic converter following engine start;
(c) Hybrid—a combination of pre-heat and post-heat where the catalytic converter is heated before and after engine start;
(d) Thermal Management—typically not associated with cold starts but maintains the converter temperature above light-off with rapid cooling; and/or
(e) Particulate filter regeneration For example, once light-off temperature is achieved during pre-heating, the controller 52 can enter a temperature maintenance mode where the temperature is simply maintained and not increased. The power demand in the maintenance mode is a fraction of that required for continuous, intense heat-up. Maintaining the temperature is accomplished either by pulsing the full induction power on and off, or by modulating the power. Pulsing is the more simple process in that the system is either on or off with only a timer control being required. The frequency and duration of pulses and the delay between pulses are selected so that the temperature is maintained constant within a few degrees. Modulating the power is more complex as the power output is automatically adjusted with the objective of maintaining a constant temperature. The more complex induction circuit needs to be operable through a full range of outputs from 0% or near zero (say min 10% or 20%) on through 100%. In one embodiment, a maintenance mode is triggered upon cooling of the catalytic converter while the engine is still running; for example, in response to cooling when the vehicle engine is idling. A pulsed or modulated operation similar to those outlined above is used to prevent excessive cool down.

Controller 52 can be implemented via a processor such as a standalone processor or a shared processing device such as an engine control module. The controller 52 uses one or more techniques, such as described herein, to control the applied induction and EHD processes in implementations where the induction field characteristics or the EHD high voltage characteristics are selectable to achieve a particular induction heating pattern or EHD effect. The controller 52 can be mounted independently of the catalytic converter. For example, the controller 52 can be mounted inside the vehicle where the electronic control circuitry is relatively well protected. Alternatively, with a weatherproof casing, the converter control module can be placed in the engine bay close to the battery or under the vehicle close to the catalytic converter.

In a control method according to an embodiment, the temperature sensors 50 include one or more thermocouples embedded on the surface of the substrate 10 at some point along its length such as at the converter mid-point. The thermocouple(s) provide direct feedback to the controller 52 with no calculation or inference being required. Calibration is first performed to compensate for offset between the outside and inside of the substrate 10. At steady state, the greatest heat losses from the catalytic converter 60 are at its periphery with convection from driving, with rainwater, snow and ice contributing to the losses. During preheating, the perimeter, core, or entire substrate 10 is heated to light-off temperature with compensation being made for the calculated offset in temperature between the light-off temperature of the desired region relative to the temperature sensor(s) 50.

While described above in conjunction with the use of separate temperature sensors 50, in addition or in the alternative, the controller 52 can use the coil 20 itself for temperature tracking. In particular, inductance of the coil 20 changes with increasing temperature as molecular vibration from heat interferes with the magnetic field. Colder temperatures produce less interference than hotter temperatures. This interference can be characterized and, from it, a bulk temperature can be determined by the controller 52. The substrate 10 is the most massive component of the induction system and heat contained within the substrate 10 has the greatest influence on inductance. The monitored temperature in this method is an average temperature as the presence of hot and cold spots is not detected. Use of the induction coil temperature sensing method obviates the need for an extra wire to the catalytic converter.

While the battery 62 is shown as providing power to the EHD process, it should be noted that a battery such as a vehicle battery or other vehicle power system can be used to selectively power the other components of the catalytic converter system 75. In other examples, an alternative power source such as a solar cell, external plug in vehicle power such as provided in conjunction with a block heater or hybrid vehicle plug in system can also be used to power the components of the catalytic converter system 75 in circumstances where alternative power is available. In operation, the induction heating and EHD processes can be selectively enabled or disabled under control of the controller 52. In various embodiments, induction heating can be initiated by the controller 52 in response to conditions such as: key in the ignition, key strike to run position; key strike to start position, proximity of the key within a predetermined number of feet of vehicle, initiation of a remote start function, plug-in vehicle to grid, block heater plug-in, etc. The operations of controller 52 can be disabled in response to light-off temperature achieved, battery state of charge too low, battery reserve required for starter reached, manual shut-off of the system, shut-off of the engine, etc.

In should be noted that the vehicle engine can operate via one or more of the following fuel types including gasoline, diesel, propane, ethanol, natural gas, etc. The control methodologies can be applied to vehicle operating configurations including fulltime conventional internal combustion, hybrid-series, parallel, mild parallel, series-parallel or power-split, plug-in hybrid electric, mild hybrid auto start-stop, range extended, constant RPM engines, variable RPM engines, or other configurations. The vehicle engine can be normally aspirated, turbo-charged, super-charged, gas-direct-injected, electronic-fuel-injected, operate via a distributor or other technologies.

The catalytic converter 60 can operate via platinum, palladium, rhodium or other catalyst and can include a diesel oxidation catalyst, particulate filter and/or urea injection system. The substrate 10 can include ceramic honeycomb, woven metal, a porous membrane or other substrate. The catalytic converter system can be directed to reducing exhaust emissions such as hydrocarbons, carbon monoxide, carbon dioxide, oxides of nitrogen, sulphur dioxide, particulate matter and/or other emissions to a full range of air-fuel ratios (lambda) such as stoichiometric, rich-burn, lean-burn and/or other ratios.

Further examples regarding the catalytic converter system 75, including several optional functions and features, are presented in conjunction with FIGS. 2-15 that follow.

Figure 2:
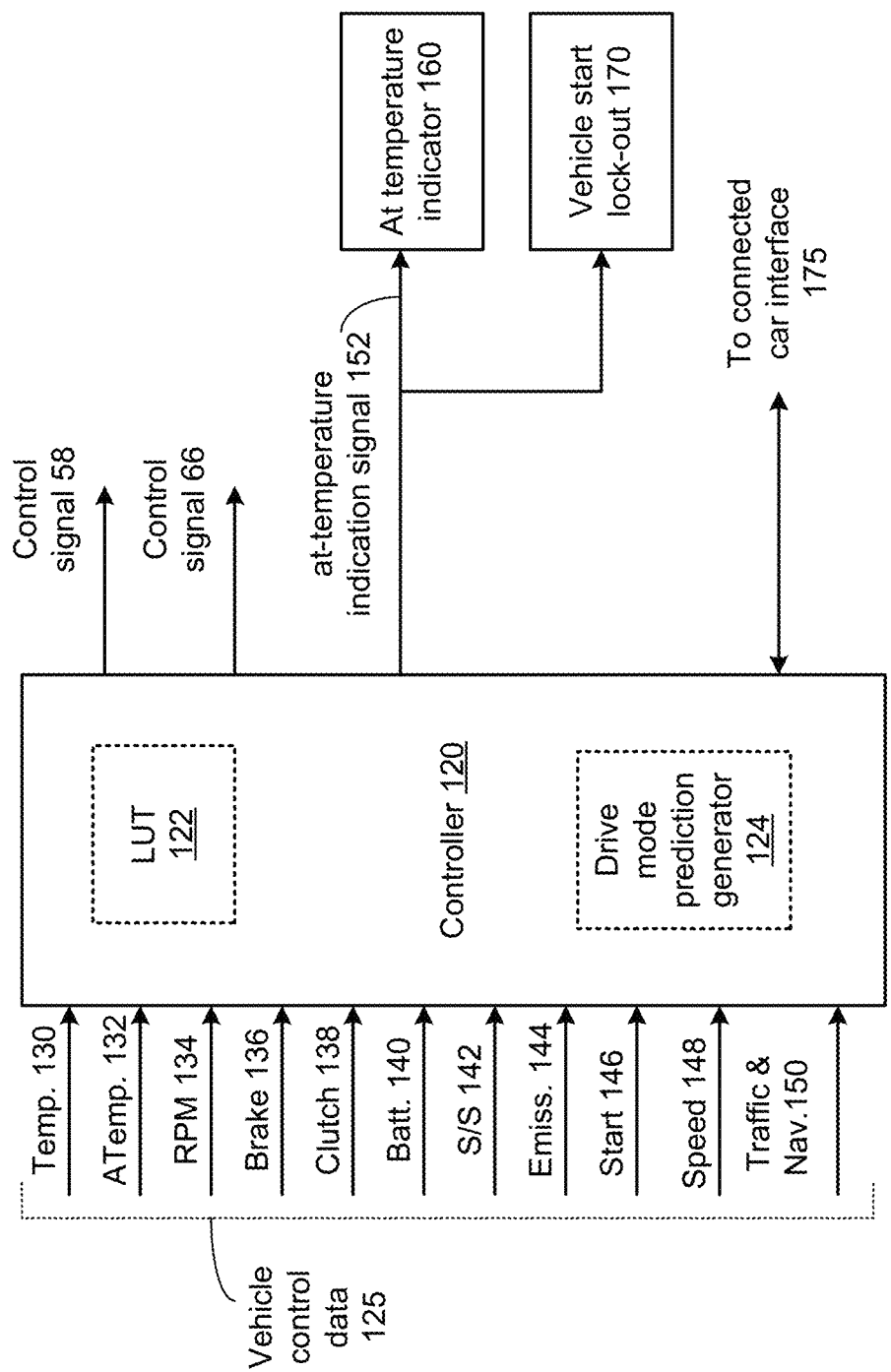
FIG. 2 is a block diagram representation of a controller according to an embodiment of the disclosure.

FIG. 2 is a block diagram representation of a controller according to an embodiment of the disclosure. In particular, a controller 120 is presented that can operate in a catalytic converter system and operate as a substitute for controller 52 presented in conjunction with FIG. 1. Like the controller 52, controller 120 operates to generate the control signal 58 for controlling the induction heating of the catalytic and control signal 66 for controlling the EHD process of the catalytic converter. Instead of operating only based on temperature data 130 from one or more temperature sensors 50 associated with the catalytic converter, the controller 120 operates based on a wider range of vehicle control data 125 such as ambient temperature data 132, engine RPM data 134 that indicates the rotational velocity of the vehicle engine, brake activation data 136, clutch activation data 138, remaining battery life data 140, stop-start mode data 142, emissions data 144, engine start data 146, speed data 148 that indicates the speed of the vehicle, traffic data and vehicle navigation data 150 that indicates the path of the vehicle, speed limits, current traffic congestion, stop and go conditions, etc. and optionally other engine control data, vehicle status data, and vehicle data such as oxygen sensor voltage, oxygen sensor temperature, exhaust gas recirculation temperature, coolant temperature, vehicle acceleration/deceleration, air-fuel ratio (lambda), ignition position, engine timing, exhaust manifold temperature, etc.

In various embodiments, the controller 120 includes a processor and a memory that stores a look-up table (LUT) 122 that responds to the states of the vehicle indicated by the vehicle control data 125 and generates control signals 58 and 66 that corresponds to the current states. For example, the LUT 122 can store control data in accordance with a state-space control algorithm based on vehicle states such as catalytic converter temperature, ambient temperature, vehicle RPM, vehicle speed indicated by temperature data 130, ambient temperature data 132, RPM data 134, and vehicle speed data 148. In this fashion, the temperature of the catalytic converter can be controlled based on changes in exhaust volume caused by variations in vehicle engine RPM, changes in ambient temperature, and heat loss due to convection at different vehicle speeds.

In various embodiments, the controller 120 compares the temperature data 130 with the reference temperature, such as the light-off temperature of the catalytic converter. The controller 120 generates an at-temperature indication signal 152 that indicates when the temperature of the catalytic converter has reached or is being maintained at or above the reference temperature. This at-temperature indication signal 152 can be used to trigger at-temperature indicator 160, such as a dashboard light, pop-up message on a dash board screen or other user interface that indicates to the driver of the vehicle when the catalytic converter has reached or is being maintained at or above the reference temperature, or that it is ok to start the vehicle. The at-temperature indication signal 152 can also be used to trigger vehicle start lock-out 170 as part of the vehicle ignition system that enables the vehicle engine to be started only when the catalytic converter has reached or is being maintained at or above the reference temperature.

Furthermore, the LUT 122 can store additional control data in accordance with additional variables. The table could further include a mapping of power level vs frequency to provide a given substrate temperature. The controller 120 can display/feedback the temperature based on the operating conditions of the resonant circuit or circuits such as the amount of current draw, resonant frequency, coil inductance, etc. In various embodiments, the controller 120 operates by determining a resonant frequency of a coil, such as metal coil 20 or other coil, and generating a control signal, such as control signal 58 or other control signal, to control induction heating of the emission control device via the coil. An alternating current (AC) source, such as AC source 64 or other AC source, responds to the control signal by selectively generating a power signal to the coil to facilitate the induction heating of the emission control device via the coil. For example, generating the control signal can include: determining, via the LUT 122, a temperature of the emission control device based on a temperature hysteresis curve and the resonant frequency of the coil; and generating the control signal to command the AC source to generate the control signal to selectively activate and deactivate induction heating by comparing the temperature of the emission control device to one or more temperature thresholds.

In various embodiments, the controller 120 is coupled to communicate with a connected car interface 175 of the vehicle that provides features such as vehicle Internet access, wireless connectivity between the vehicle and wireless user devices such as a smartphone, tablet, smartwatch, laptop computer or other computing device, as well as wireless access for use in service and vehicle diagnostics, vehicle inspections and other connectivity. Emissions data 144 received from an engine control module or from separate emission sensors can be processed and/or stored in a memory associated with the controller 120 in order to provide a historical record of actual vehicle emissions.

Figure 3:
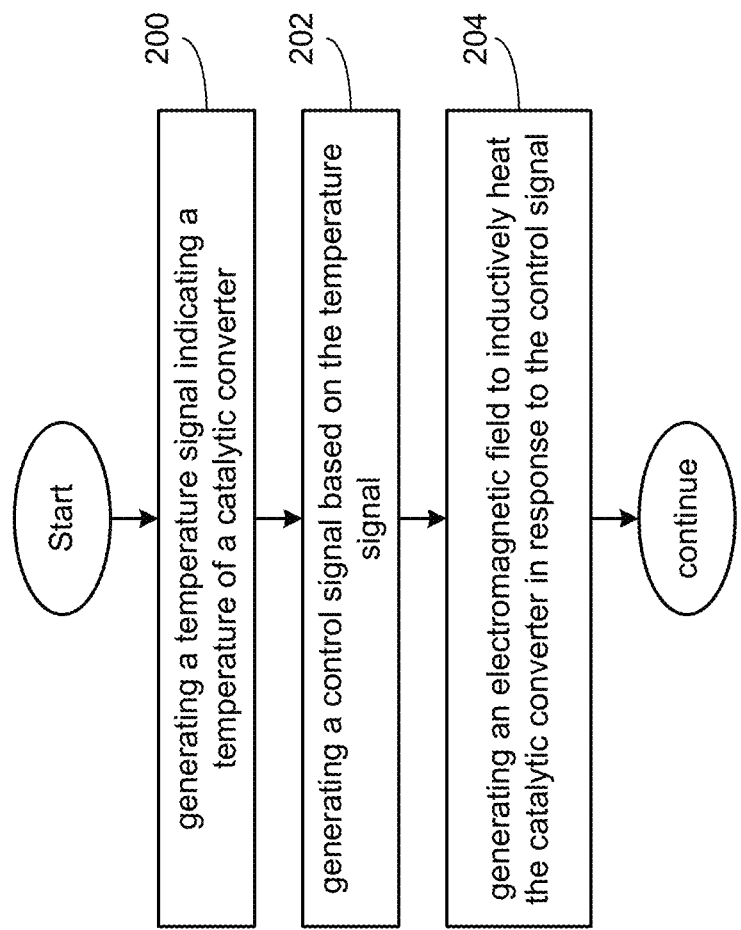
FIG. 3 is a flow diagram representation of a method according to an embodiment of the disclosure.

FIG. 3 is a flow diagram representation of a method according to an embodiment of the disclosure. In particular, a method is presented for use in conjunction with one or more functions and features presented in conjunction with FIGS. 1-2. Step 200 includes generating a temperature signal indicating a temperature of a catalytic converter. Step 202 includes generating a control signal based on the temperature signal. Step 204 includes generating an electromagnetic field to inductively to heat the catalytic converter in response to the control signal.

In various embodiments, the control signal is generated further based on a reference temperature, to control the temperature of the catalytic converter in accordance with the reference temperature. The method can further include generating an at temperature signal indication signal when the at least one temperature of the catalytic converter compares favorably to the reference temperature. Start-up of a vehicle engine can be enabled in response the at temperature signal indication signal.

In various embodiments, the controller generates the control signal further based on at least one of: a signal indicating a rotational velocity of the vehicle engine; a signal indicating an ambient temperature of the vehicle containing the catalytic converter system; a signal indicating an auto start-stop mode of the vehicle engine; a signal indicating a remaining charge in a vehicle battery. The method can further include predicting a current one of a plurality of driving modes based on vehicle control data and the control signal can be generated in accordance with the current one of the plurality of driving modes. The method can further include controlling an electrohydrodynamic heat/mass transfer process of the catalytic converter system.

Figure 4:
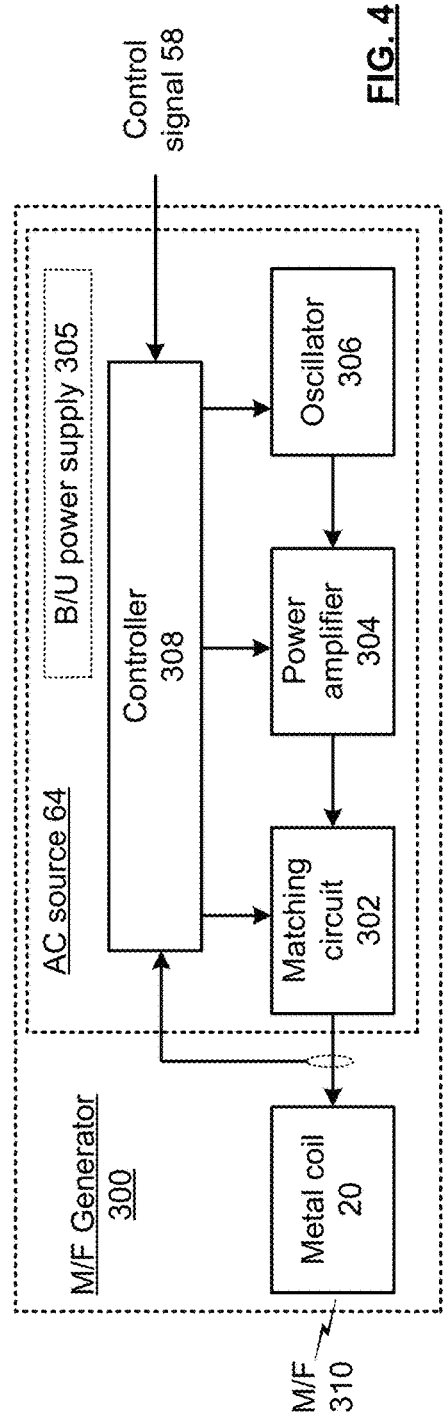
FIG. 4 is a block diagram representation of an electromagnetic field generator 300 according to an embodiment of the disclosure.

FIG. 4 is a block diagram representation of an electromagnetic field generator 300 according to an embodiment of the disclosure. In particular, a magnetic field generator 300 is presented that includes the AC source 64 and metal coil 20. In operation, the AC source responds to a control signal, such as control signal 58, by generating a magnetic field 310 to inductively heat a catalytic converter substrate, such as substrate 10. In particular, the magnetic field generator 300 includes a coil, such as metal coil 20, that radiates the magnetic field 310.

A potential issue with operating AC source 64 from a battery, such as a vehicle battery, is that there is a correlation between the voltage draw, current draw, and therefore power draw. This can cause power variations during preheat of the emission control device. The battery may be fully charged so that the voltage is relatively high, for instance when the alternator of a vehicle just finished charging the battery before the vehicle was turned off. A high voltage results in a high current draw and thus a high power. In other cases, the battery charge may be depleted so that the battery voltage is relatively low, for instance when there has been excessive draw on the battery when the engine was not running. This can happen when the interior lights or other accessories are on for an extended period of time. A low voltage results in a low current and thus a low power. Furthermore, the battery voltage may not be constant within a given engine start cycle. The voltage will go down with the start when the battery power is drawn down and then back up when the alternator kicks in to charge the battery. The battery voltage at the start can be as low as 11 VDC and alternator can charge as high as 13.5 VDC or more. This difference can be as much as 20%. Based on the correlation between voltage and current, this means that the current can be different by as much as 20% too. The low voltage draw of 80% and the low current draw of 80% produce a power draw just after start of 64% (80% Vdraw×80% A=64% W) of the power draw at the end of the cycle. This 36% swing in power between the start and end of the heating cycle can result in lost heating opportunity and efficiency and a longer heating time to reach light-off temperature of the emission control device.

In operation, the control signal 58 is generated by the controller 52 or 120 to control induction heating of the emission control device. The control signal 58 can include an indication to initiate heating of the emission control device at start-up of an engine that contains the emission control device or a predetermined time thereafter (e.g. 1 sec, 2 secs, 5 seconds, 10 seconds, 20 seconds, etc). In addition to the indication to initiate heating, the control signal 58 can also indicate a power set point such as a targeted amount of power transfer or other power level.

The control signal 58 can also provide an indication to discontinue induction heating of the emission control device. For example, the controller 52 or 120 can generate the control signal 58 to discontinue induction heating of the emission control device a predetermined time after induction heating of the emission control device is initiated (e.g. an expected amount of time to reach light off temperature such as 200 seconds of other time period). In other cases, the controller 52 or 120 can generate the control signal 58 based on comparison of a temperature of the emission control device to a reference temperature, such as light-off temperature. As previously discussed, the temperature of the emission control device can be determined based on a temperature sensor such as a thermocouple or based on a change in impedance of the coil. In this fashion, the control signal 58 can be generated to initiate induction heating at temperatures below light-off and to discontinue heating when light-off temperature is reached. The controller 52 or 120 can also generate the control signal 58 to suspend induction heating of the emission control device in response to a no-load condition of the coil indicated, for instance by the presence of a coil voltage and a low coil current or lack of a coil current. Furthermore, the controller 52 or 120 can monitor a temperature of one or more components of the electromagnetic field generator 300, particularly the power amplifier 304. The controller 52 or 120 can generate the control signal 58 to discontinue induction heating of the emission control device when the temperature exceeds a temperature threshold to avoid damage to the components of the power amplifier 304 and/or other components of the electromagnetic field generator 300.

The electromagnetic field generator 300 responds to the control signal 58 by generating a power signal that is applied to the metal coil 20 to cause the induction heating of the emission control device. The electromagnetic field generator 300 operates, for example, to maintain a fixed power draw during the voltage draw peaks and valleys by adjusting a frequency of the power signal to control the power transferred to the coil.

In various embodiments, oscillator 306 such as a voltage controlled oscillator, ring oscillator, or other oscillator circuit is configured to generate the power signal. In particular, the oscillator operates under control of the controller 308 to adjust the frequency of the power signal to stabilize power transfer. For example, the controller 308 can monitor a coil current, coil voltage, current draw and/or other operational parameters of the AC source 64 and include a look-up table, state machine, or iterative control algorithm in order to determine a frequency that improves the power factor, to match a resonant frequency of a tank circuit that includes the coil or otherwise to stabilize or otherwise improve and/or stabilize the power transferred by the magnetic field generator 300 to the conductive components of the catalytic converter substrate for improved induction heating.

A power amplifier 304, such as a class A, Class B, Class C, Class D or Class E (including combinations thereof) power amplifier circuit is configured to amplify the power signal to generate an amplified power signal at an output of the power amplifier 304 to drive the coil. The power amplifier 304 can include one or more transistors such as bipolar junction transistors, insulated-gate bipolar transistors, metal oxide semiconductor field effect transistors (MOSFETs) and/or other power transistors. In various embodiments, the power amplifier 304 operates as a switch to generate an AC power signal at its output.

An impedance matching network 302 is configured to impedance match the output of the power amplifier 304 to the coil. In particular, the impedance matching network 302 can include one or more capacitors to form a resonant tank circuit with the coil, such as metal coil 20 and optionally one or more other reactive impedances such as capacitors and/or inductors in a Pi-network, L-network or other impedance matching circuit configuration. In various embodiments, controller 308 is configured to adjust an impedance of the impedance matching network 302 to improve power transfer. For example, the controller 308 can monitor a coil current, coil voltage, current draw, power signal frequency and/or other operational parameters of the AC source 64 and include a look-up table, state machine, or iterative control algorithm in order to control an adjustable impedance to improve the power factor, to match the impedance of a tank circuit that includes the coil or otherwise to maximize or otherwise improve the power transferred by the magnetic field generator 300 to the conductive components of the catalytic converter substrate for improved induction heating.

The electromagnetic field generator 300 optionally includes a back-up power supply 305 that includes a capacitor, rechargeable battery or other rechargeable storage device that is charged by the vehicle during periods when the electromagnetic field generator 300 is not operating or excess power from the vehicle is otherwise available. In circumstances where the operation of the system is inconsistent/intermittent due to high loads on the vehicle power supply system, the back-up power supply 305 provides supplemental power to the electromagnetic field generator 300 to enable uninterrupted operation of the control and induction system, such as control to its specified/target output level.

Consider the following example, the oscillator 306 generates one or more switching signals such as a square wave with substantially a 50% duty cycle (e.g., 45%-55%). The power amplifier 304, in turn, supplies a high voltage/high current version power signal by switching between 0 VDC and a higher voltage. In various embodiments, the power amplifier 304 is implemented a via an H-switching insulated gate bipolar transistor circuit that is controlled by two square wave signals with substantially 50% duty cycle signals of different phases and the same frequency generated by the oscillator 306. The switching signals have a "dead-time" during switching in which neither signal is high. This allows the switching elements in the H-switching insulated gate bipolar transistor circuit to switch off completely before the next element is turned on. This prevents "shoot-through", a condition in which a short circuit is created when both switching elements are on or partially on.

The controller 308 controls the power transferred to the metal coil 20 by adjusting the frequency of the power signal. The resonant frequency of the metal coil 20 is given by:

$$F_{RES} = \frac{1}{2\pi\sqrt{2LC}} \quad (1)$$

Where: $F_{RES}$ is the resonant frequency of the metal coil (in Hz).
L is the inductance of the metal coil 20 (in Henrys).
C is the capacitance of a resonant capacitance of the impedance matching network 302 (in Farads).

Maximum power is transferred to the metal coil 20 at its resonant frequency. As the frequency is increased above or below resonance, the power transferred to the metal coil 20 drops. The controller 308 monitors a voltage and/or current of the power signal and adjusts the frequency of the power signal based on the voltage of the power signal to control the power transferred to the coil that is transferred to the metal coil 20. In particular, the frequency of the power signal can be dynamically adjusted, based on the coil voltage to draw a current with a constant power draw that, after an initialization period for example, matches the desired power set point. This can be accomplished by monitoring the coil voltage and/or current via voltage or current sensors and using controller 308 to make empirical adjustments to the power signal frequency. This allows the magnetic field generator 300 to operate during quiescent periods at the same power at 11 volts on through 13.5 volts and also adapt to changes in material properties due to temperature. As the emission control device rises in temperature, the induction coil resistance and heating wire inductance will change. Tuning adjustments in the frequency of the power signal can ensure that temperature does not adversely impact the power draw.

In various embodiments, the controller 308 determines the power transferred to the metal coil 20, compares the power transferred to the coil to the power set point and adjusts the frequency of the power signal based on a comparison of the power transferred to the coil and the power set point. The controller 308 can adjust the frequency of the power signal by:
  (a) decreasing the frequency of the power signal when the power transferred to the metal coil 20 is below the power set point; and
  (b) increasing the frequency of the power signal when the power transferred to the coil is above the power set point.

For example, the frequency of the power signal can be adjusted between a maximum frequency limit and a minimum frequency limit. The maximum frequency limit can be set to a predetermined frequency above the resonant frequency of the metal coil 20, such as 150% of the resonant frequency, 200% of the resonant frequency or some other value. The minimum frequency limit can be set at the resonant frequency of the metal coil 20. For example, the controller 20 can run a frequency sweep of the power signal at start-up or periodically during operation and determine $F_{RES}$ based on the frequency were the power transfer peaks.

In various embodiments, the controller 308 can initiate induction heating by starting the power signal at a high frequency, such as the maximum frequency limit and ramp down to the heating frequency in a predetermined amount of time, such as 2 seconds, 5 seconds, 10 seconds or some other time. This prevents high initial current surges or voltage spikes to the metal coil 20 during turn on. Once at the heating frequency, the power output is maintained for the heating period and then the power signal is turned off.

In various embodiments, the frequency of the power signal can adjusted by the controller 308 in discrete frequency steps of different sizes such as large frequency steps and small frequency steps that are smaller than the large frequency steps. For example, when there is a change in power set point, the frequency of the power signal can be adjusted in large frequency steps until the new power set point is reached. When there is no change in the power set point, the frequency of the power signal can be adjusted in small frequency steps in order to maintain the power transfer at or near the power set-point. An example algorithm is presented below:
  1. If operating power set point changed, set step size to large.
  2. Measure operating power level.
  3. If at power set point then do not change frequency. If less than set point then decrease frequency by step size otherwise, increase frequency by step size. Do not exceed the maximum or minimum frequency limits.
  4. Measure new operating power level.
  5. If step size set to large:
     a. If the set point has not been reached or overshot go to step 3.
     b. Otherwise, the set point has been reached or overshot. Set the step size to small and go to step 3.

In another mode of operation, once the resonant frequency is determined for a set of operating conditions corresponding to maximum power transfer, the power can be regulated by the controller 308 to a lower power set point by using the resonant frequency, but by pulsing the power on for certain pulse durations over a time period (e.g. 100 msec, 500 msec, 1 sec, 2 seconds or some greater or lesser time period) and off the remaining portions of that time period. The average power can correspond to the desired power setpoint but the induction draw will be greater than the power setpoint for the power-on portion of the time period and zero for the remaining portion of the time period. If the resonant frequency of the metal coil 20 changes, for example, due to changes in coil inductance, the controller 308 can periodically determine the new resonant frequency by running a frequency sweep and determining the resonant frequency as the frequency with maximum power transfer to the coil. Using the resonant frequency can generate greater thermal and electrical efficiency. The average of the peak and off (zero power) periods produces the overall desired heating/power. If, for example, the desired power set point is 90% of the maximum power, the resonant frequency can be applied to the metal coil 20 90% of the time and the coil can be turned-off the other 10% of the time. In addition, the regulation of both the frequency and the pulse durations can be applied to the control of the power transfer to the metal coil 20.

While the foregoing control methodologies have focused primarily on vehicle systems and 50% duty cycles, in some applications including mining or industrial applications, higher duty cycles can be applied to heating of the emission control device. While the controller 308 is shown as being separate from controllers 52 and 120, it should be noted that the functionality of controller 308 can likewise be incorporated in either of the other control devices for implementation via a single processor, circuit or other device.

While not expressly shown, the controller 52 or 120 and/or the controller can be coupled to a memory for storing operating parameters and/or to a display such as a vehicle display or monitor for use in diagnostics and/or review by the operator of the vehicle or other system that contains the emission control device. Operating parameters such as temperature, voltage, current, resonant frequency, time to light-off, and other operating conditions as well as error conditions and other data can be stored, displayed and/or output, for example, as graphics and/or a text file, csv file or other data file. Normal operation can be indicated and error messages can be generated to ensure the safety of the operator, the vehicle and the induction heating system. Realtime voltage, current, frequency and power can be stored and displayed along with the temperature of the emission control device. The results of a connection safety check can be stored and displayed indicating there is a load and coil attached before the initiation of induction heating or a fault if no load is found. The temperature of the power amplifier 304 can be displayed and/or indications of normal operating temperature and an over-temperature fault.

Figure 5:
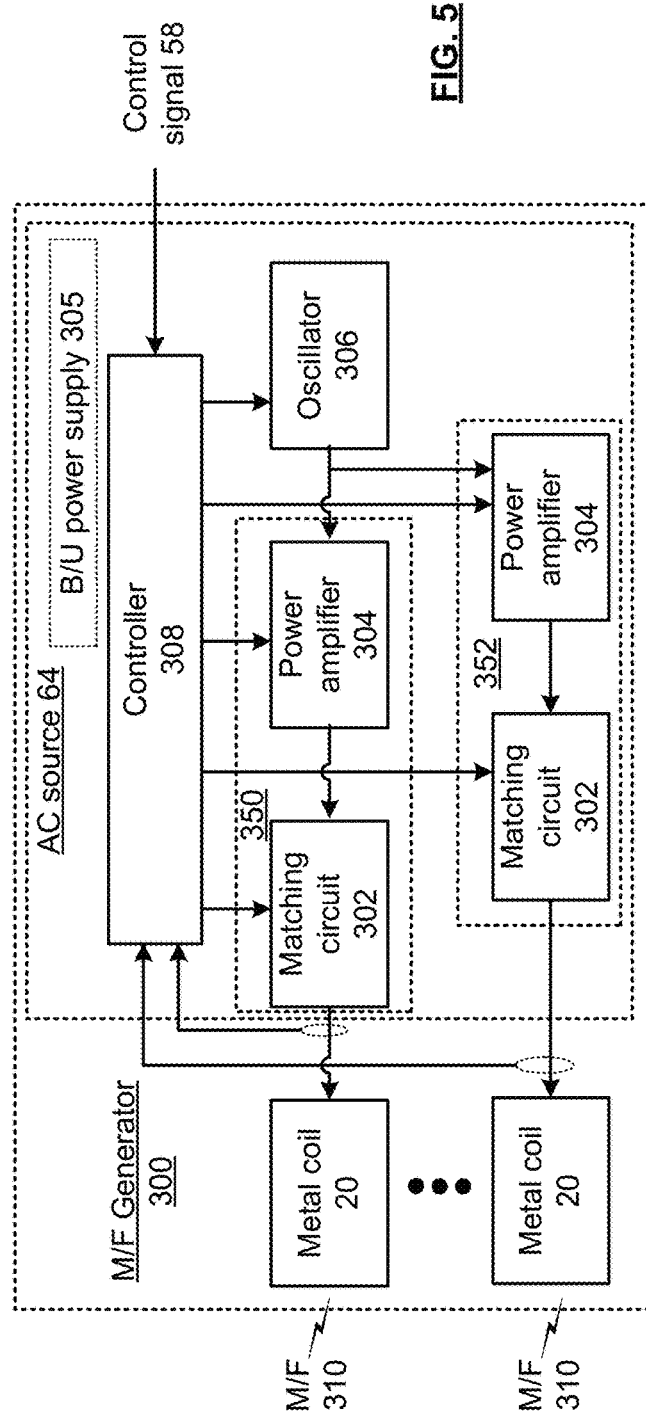
FIG. 5 is a block diagram representation of an electromagnetic field generator 300 according to an embodiment of the disclosure.

FIG. 5 is a block diagram representation of an electromagnetic field generator 300 according to an embodiment of the disclosure. In particular, a magnetic field generator 300 is presented that includes many common functions and features described in conjunction with FIG. 4 that are referred to by common reference numerals. In the embodiment shown however, the magnetic field generator 300 includes a plurality of coils, such as metal coils 20 and separate drive paths 350, 352, etc.

The controller 308 operates to control the operation of each of the metal coils 20 in response to one or more control signals 58. In addition to the functions and features described in conjunction with FIG. 4, the controller 308 operates in response to the control signal 58 to selectively enable and disable, and/or allocate power to, the separate drive paths 350, 352, etc. in order to activate and power selected ones of the plurality of coils. Consider the case where the control signal 58 commands the AC source 64 to produce only a fraction of the maximum power at a particular time. In this case, one or more of the coils can be deactivated by disabling their corresponding drive path(s) in order to produce more fine control. Because the coils, when driven, modify the inductance of one another based on changes in mutual inductance, activating and deactivating the various coils can be accompanied by adjustments to the one or more impedances of the corresponding matching circuit(s) 302 and/or adjustments to the frequency of the corresponding oscillator(s) 306 of the activated drive paths in order to improve the power factor, adjust the resonant frequency of a tank circuit that includes the coil, adjust the resonant frequency of the coil to match the drive frequency or otherwise to maximize or otherwise improve the power transferred by the magnetic field generator 300 to the conductive components of the emission control device for improved induction heating.

FIG. 6 is a graphical diagram 400 of a control set point as a function of time according to an embodiment of the disclosure. In particular a control set point 402 is shown that, for example, is included in control signal 58. The control set point 402 can be used to control the operation of a magnetic field generator, such as the magnetic field generator 300 presented in conjunction with FIGS. 4-5 or other induction heating element of an emission control device associated with an engine.

At time $t_0$, the engine associated with the emission control device is started. The control set point 402 implements a start delay before setting the initial power set point $P_1$ at time $t_1$. The start delay allows electromagnetic field generator 300 to be initialized and allows the battery voltage to potentially stabilize before the coil is commanded to turn on. As discussed in conjunction with FIG. 4, the electromagnetic field generator 300 operates by adjusting a frequency of the power signal in order to reach and maintain the power transferred to the coil at the power set point $P_1$.

At time $t_2$ the power set point 402 is reset to zero, either because the temperature is determined to have reached light-off or an error condition has been detected such as a no-load coil condition or power amplifier over-temperature condition or because a predetermined initial time period has expired. At time $t_3$, the power set point 402 is set to a lower value $P_2$, in absence of error conditions, for example, because the temperature is determined to have fallen below light-off or otherwise to maintain the temperature of the emission control device at or above light-off. At time $t_4$, the power set point 402 is reset to zero. While, in the example shown, there is a delay between $t_3$ and $t_2$, the lower power program with power set point $P_2$ can be set to begin immediately after the initial program at time $t_2$.

While the power set point 402 is shown as having two discrete values, in other embodiments a greater or fewer number of values could be used. Furthermore, the timing presented is for illustrative purposes only and is not necessarily drawn to scale.

FIG. 7 is a graphical diagram 410 of a power signal as a function of time according to an embodiment of the disclosure. In particular, the power signal 412 at the coil, such as metal coil 20, is shown. As discussed in conjunction with FIG. 4, the power signal 412 is a square wave with substantially a 50% duty cycle. Greater or lesser duty cycles can be employed however.

The period of the power signal is $T_i$ and the frequency (in Hz) is $1/T_i$. As previously discussed, the frequency of the power signal 412 can be controlled in order to control the power transfer to the coil.

FIG. 8 is a flow diagram 420 of a method according to an embodiment of the disclosure. In particular, a method is presented for use with one or more functions and features discussed in conjunction with FIGS. 1-7. Step 422 includes generating a control signal to initiate induction heating of an emission control device. Step 424 includes generating, in response to the control signal a power signal, wherein the power signal is applied to a coil to cause the induction heating of the emission control device. Step 424 includes adjusting a frequency of the power signal, to control a power transferred to the coil.

In various embodiments, adjustments in frequency can be used to move the heat within the pin material of the substrate. As the power is increased, the magnetic field grows in size and intensity. This may provide a different heating signature between frequencies. Just changing the frequency may not produce the desired effect in all circumstances. This is because a given heat profile within the ceramic substrate will look similar regardless of frequency under some conditions. The heat profile, under the normal operating range, will change proportionally with power draw/delivery which is dictated by the tuning frequency. But there are cases where this is not true—such as when the coil is at the point of saturation of the magnetic field.

Seen in some magnetic materials, saturation is the state reached when an increase in applied external magnetic field H cannot increase the magnetization of the material further, so the total magnetic flux density B more or less levels off (It continues to increase very slowly due to the vacuum permeability.) Saturation is a characteristic of ferromagnetic materials, such as iron, nickel, cobalt and their alloys. The intensity of the magnetic field can be increased or decreased by decreasing or increasing the frequency away from resonance, respectfully. The resonant frequency of the pins can be the lowest frequency used within the control of the system. At resonance, this is the highest power draw and therefore the maximum heating. Higher frequencies result in lower power draws. At saturation, there is a sudden drop in inductance, and even though there is a lot of current, there is a plateau of power driving the coil. This means that there may not be the same flux linkages delivering the power and it becomes difficult to apply more heat, and this further heating becomes less effective.

There is an opportunity to use saturation advantageously to facilitate moving the heat to differing locations within the substrate. By determining the conditions for saturation, either experimentally or by simulation, a system can be designed that will generate heat in one region of the ceramic up to saturation and then move that heat to another area (or multiple areas) thereafter. For example, the pins embedded in the ceramic substrate of the emission control device can be designed with a plurality of differing lengths so as to saturate at different times, causing some regions of the emission control device to heat faster, and reach magnetic saturation, before the other regions of the emission control device.

For example, the back region of the ceramic substrate can be heated more intensely than the front at any point below saturation. The more intense heating of the back region can imply that the back pins will achieve saturation first. This saturation should produce a maximum temperature for the pins that stays constant under steady state conditions—the heat has plateaued. While the heat at the back region has plateaued, the front region of the ceramic continues to heat at the accelerated, below-saturation rate until the pins (or portions of pins) in this region achieve a similar temperature once saturation is achieved. The opposite can also be applied with the front heating up before the back. In other designs, the inside pins can be heated before the outside pins or vice versa. This can also be performed with a single pin material.

Furthermore, the frequency of the power signal can be adjusted to control a location of heating within the emission control device with some regions of the substrate receiving more heating than others. The frequency tuning, and thus power delivery, can be set by the controller to maintain a particular region of the pins at the point of initial saturation. This allows other regions of the pins to rapidly heat to the same level if desired. For example, the frequency of the power signal can be adjusted from one frequency before some regions of the emission control device reach magnetic saturation—to a new frequency, after these regions of the emission control device reach magnetic saturation. This new frequency can, in turn, drives other regions of the emission control device to magnetic saturation after the original regions of the emission control device have reached magnetic saturation.

Furthermore, active frequency tuning can be used from the start of heating until full saturation and then again until the system is shut-off. While the inductance and/or resistance will be constantly changing, the impedance matching performed by matching circuits 302 of FIGS. 4 and 5 and the frequency or operation can be iteratively adjusted by the controller to compensate for these changes, based on the desired heating profile.

Several further examples are described in conjunction with FIGS. 9-15 that follow.

FIG. 9 is a cross-sectional view 500 of a substrate according to an embodiment of the disclosure. In particular, an example of substrate 10 is presented that includes a plurality of pins 505 of several different lengths. The exhaust gas 56 (when present) flows through the substrate 10 from a region 502 to a back region 504 where it exits as processed exhaust gas 56'. The shortened length of many of the pins 505 in the back region 504 can cause the portions of the pins in this region to reach saturation before the other portions in region 502.

FIG. 10 presents graphical diagrams of several temperature profiles according to an embodiment of the disclosure. In particular, three stages are shown of a heat-up procedure of a substrate, such as the substrate 10 of FIG. 9. In diagram 510, temperature profile 512 presents a state during the initial heating of the substrate, where the heating occurs primarily in the back region 504. In diagram 515, the temperature profile 516 presents a state where the back region 504 of the substrate has reached saturation before the front region 502. In diagram 520, the temperature profile 522 shows a state where both the back region 504 and the front region 502 have reached saturation.

Heating the back region before the from region can be advantageous during the onset of exhaust gas flow since the heat from the exhaust gas will initially have a greater impact on the front region 502 of the substrate. In other configurations of pins however, however, the heating can be reversed, applied to inside and outside regions, and more generally to three or more regions different of the substrate.

Figure 11:
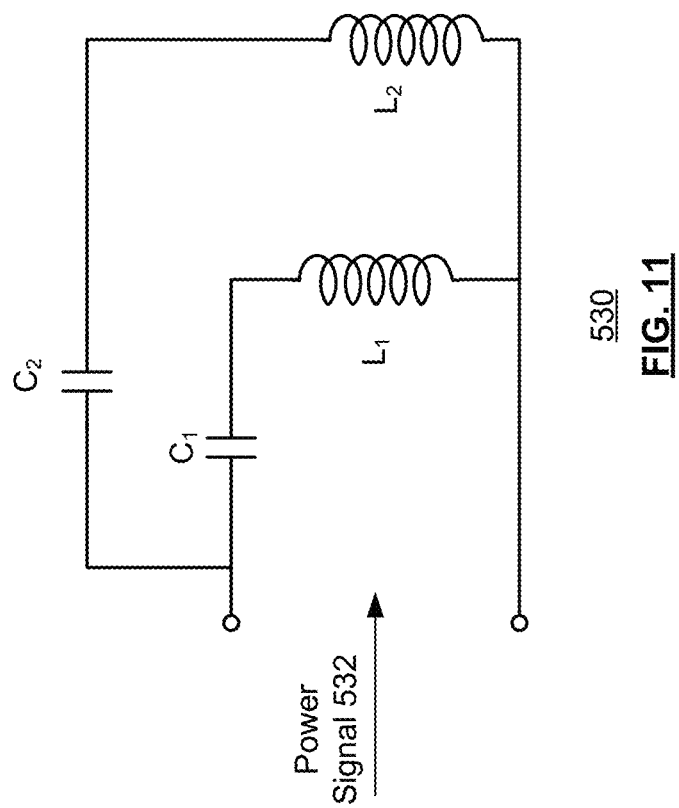
FIG. 11 is a schematic diagram of a circuit according to an embodiment of the disclosure.

FIG. 11 is a schematic diagram 530 of a circuit according to an embodiment of the disclosure. While the discussions of FIGS. 8-10 have primarily focused on induction heating by a single coil, as discussed in conjunction with FIG. 5, two or more coils can be employed at different locations along a substrate. A power signal 532 can be generated and applied to a plurality of coils to cause the induction heating of the emission control device. The total power of the system can be selectively allocated among each of a plurality of coils, for instance, to selectively allocate heating among these different locations.

In various embodiments, different heating signatures can be produced within a single system using multiple induction coils in series within a given emission control system. For example, one coil operates under its own tuning profile and one or more other coils operate at a separate tuning profile that is different from the first coil. This can be controlled by a single power supply that uses a multiple H-bridge switching circuit or other power amplifier circuit. The multiple coils can be intertwined or separate from each other. The desired heating profile for the application can be used to determine which configuration is selected.

Consider the circuit that is shown. A first coil is represented schematically by the inductor $L_1$. A second coil is represented schematically by the inductor $L_2$. The values of the capacitors $C_1$ and $C_2$ can be selected such that the first coil has a first resonant frequency (based on the values of $L_1$ and $C_1$) and the second coil has a second resonant frequency (based on the values of $L_2$ and $C_2$). The frequency of the power signal 532 can be adjusted to control the power transferred to each coil based on how close the frequency is to the resonant frequency of each LC resonant circuit.

Power to one coil can be maximized by choosing a power signal frequency that matches the resonant frequency of the its corresponding LC resonant circuit, while the other coil is driven off-resonance with a lower power transfer.

In various embodiments, a simple front and back induction heating system can include one induction coil at the front and a second at the rear. A symmetric wire profile can be used in this example as it has the same number and mass of pins at the front and back. A frequency can be selected so that both the coils are tuned a similar offset from resonance and powered equally, the front and back heat up symmetrically based on the desired program. However, if one coil is operated at closer to the resonant frequency than the other, then more heat will be generated at the end that is tuned closer to the resonant frequency and less heat will be generated at the other end that is tuned further from the resonant frequency. For example, the power signal 532 can be generated to have a power signal frequency corresponding to the first resonant frequency. The effect is to allocate more of the total system power to the first coil and more power transfer (prior to saturation) to the pins of the substrate in the region of first coil.

While a configuration is shown with two inductors and two capacitors, other configurations with three or more inductors and a corresponding three or more capacitors, are likewise possible.

Figure 12:
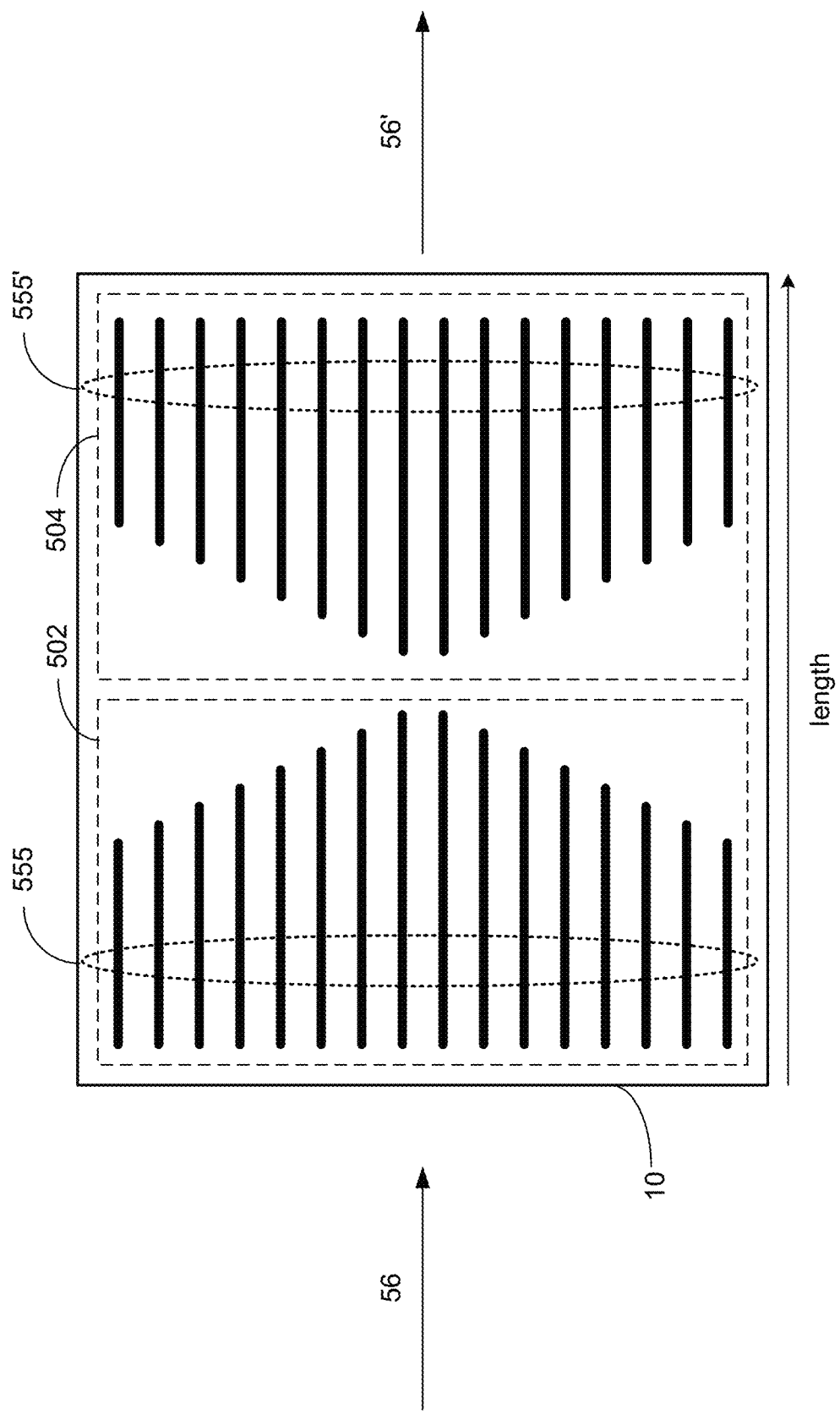
FIG. 12 is a cross-sectional view of a substrate according to an embodiment of the disclosure.

FIG. 12 is a cross-sectional view 550 of a substrate according to an embodiment of the disclosure. In particular, an example of substrate 10 is presented. The exhaust gas 56 (when present) flows through the substrate 10 from a region 502 to a back region 504 where it exits as processed exhaust gas 56'. The substrate 10 includes a plurality of pins 555 of several different lengths in front region 502 and a plurality of pins 555' of several different lengths in back region 504.

The substrate 10 shown in this example is suited for a configuration where a first coil is aligned about pins 555 in the front region 502 and a second coil is aligned about pins 555' in the back region 504. This configuration can be used in conjunction with the circuit of FIG. 11 to control the power transfer, via the frequency of the power signal 532, to each of the two coils and the corresponding heating of the front and back locations 502 and 504.

While the discussion of FIG. 11 focused on multiple coils driven by a single power signal 532, other embodiments are possible in other designs (such as shown in FIG. 5) where different coils at different locations in the substrate are driven separately by independently controlled power signals. In a two-coil system with independent power signals, for example, it is possible to completely turn off one of the coils so that it receives no power/heat and 100% is directed to the other coil. The allocation of power and heating between one region and the other(s) can be 100%:0%, 50%:50%, 0%:100%, and X %:(1–X) % which denotes every possible combination in between. For example, the power from a 1 kW power supply can be directed 100% of the total power to one coil via a first power signal to the front coil only, split the total power 50%:50% in second and third power signals directed to the coils in the front and back, direct 100% of the total power via a fourth power signal to the coil in back only, or split the total power proportionately X %:(1–X) % via other power signals that drive the front and back coils. At the end of the heating, the total power (1 kW in this example) can be delivered to the pins in differing locations along the substrate in multiple profiles.

Figure 13:
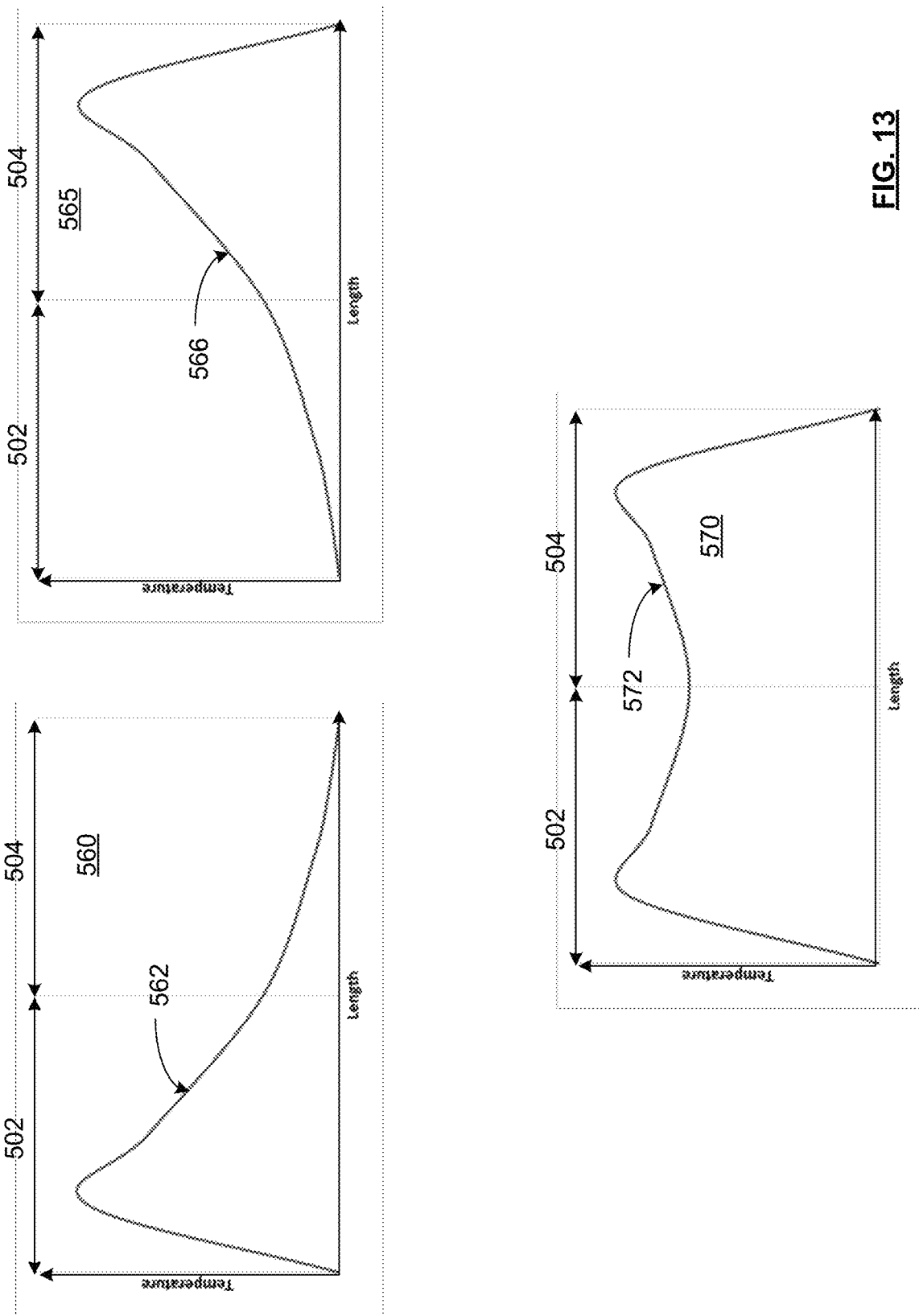
FIG. 13 is graphical diagrams of several temperature profiles according to an embodiment of the disclosure.

FIG. 13 presents graphical diagrams of several temperature profiles according to an embodiment of the disclosure. In particular, three temperature profiles are shown of a heat-up procedure of a substrate, such as the substrate 10 of FIG. 12. In diagram 560, temperature profile 562 presents a state during the initial heating of the substrate via a 100%:0% front to back power allocation, where the heating occurs primarily in the front region 502. In diagram 565, temperature profile 566 presents a state during the initial heating of the substrate via a 0%:100% front to back power allocation, where the heating occurs primarily in the back region 505. In diagram 570, temperature profile 572 presents a state during the initial heating of the substrate via a 50%:50% front to back power allocation, where the heating occurs equally split between the front region 502 and the back region 504.

Figure 14:
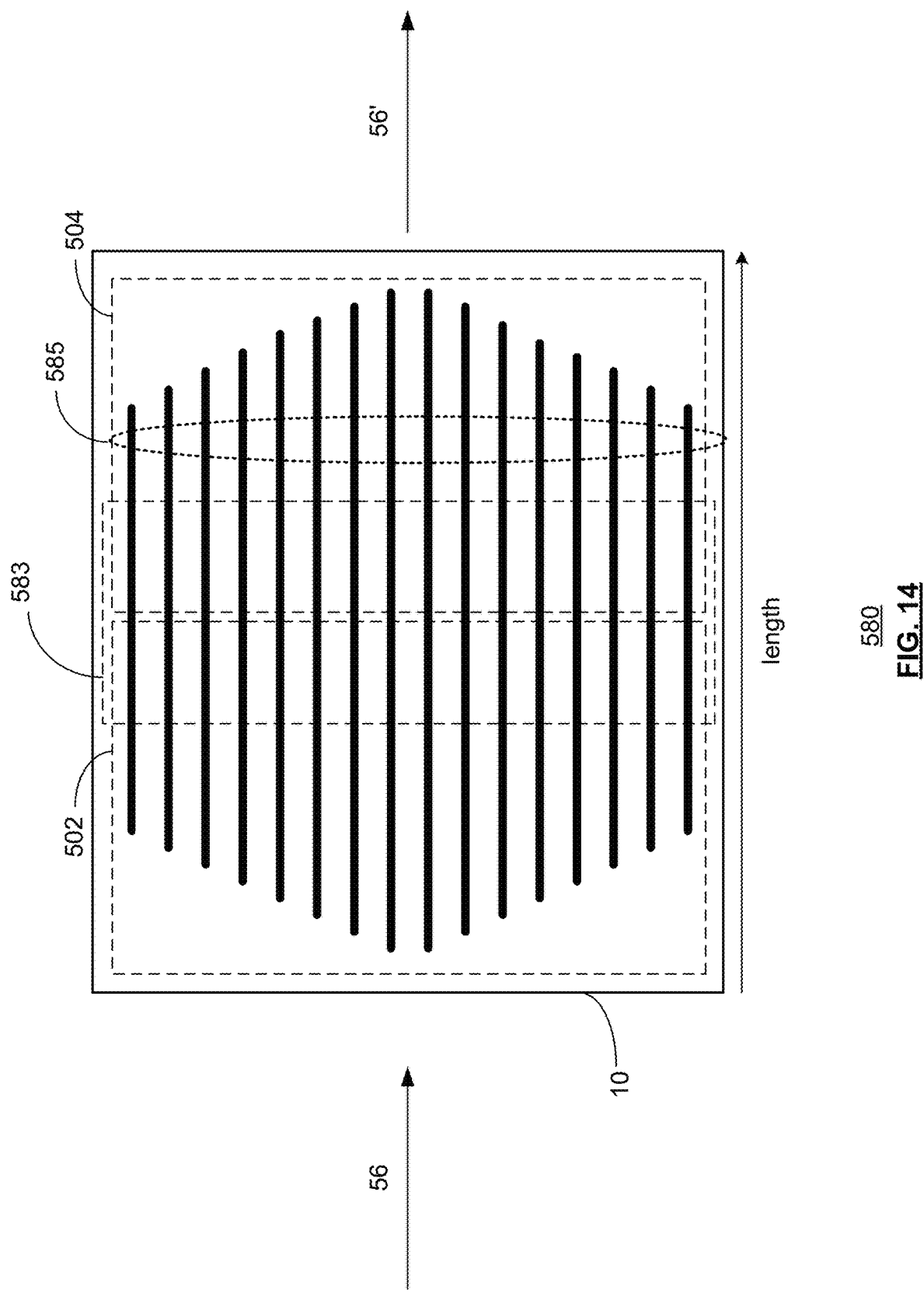
FIG. 14 is a cross-sectional view of a substrate according to an embodiment of the disclosure.

FIG. 14 is a cross-sectional view 680 of a substrate according to an embodiment of the disclosure. While the example shown in FIG. 12 contemplated two non-overlapping coils, one in the front region 502 and the second in the back region 504 of the substrate 10, in the present example, another example involves intertwined coils, where the first coil is long and the second coil is smaller and placed in the middle of the first coil.

In the example shown, a single set of pins 585 of several different lengths are embedded in the substrate 10. A first coil runs the length of the substrate 10 and encompasses both the front region 502 and the back region 504. A second coil overlaps the first coil in the region 583 that intersects a portion of the front region 502 and also a portion of the back region 504. The windings between the two coils can alternate with each other in the region 583 to produce this configuration with no gap in the first coil (but the gap configuration is also possible). The intertwined coils can operate proportionately in accordance with either a single power signal 532 or multiple independently controlled power signals.

Powering the first, longer coil will heat the whole ceramic at a moderate rate because of the larger volume of substrate 10 to be heated. Powering the second, shorter coil will heat just the middle of the ceramic at a higher rate because of the reduced volume to be heated. Powering both coils will heat the ends of the ceramic moderately and will heat the centre at a much higher rate.

FIG. 15 presents graphical diagrams of several temperature profiles according to an embodiment of the disclosure. In particular, three temperature profiles are shown of a heat-up procedure of a substrate, such as the substrate 10 of FIG. 14. In diagram 590, temperature profile 592 presents a state during the initial heating of the substrate via a 100%: 0% first to second coil power allocation, where the heating occurs evenly in the front and back regions 502 and 504 over the length of the substrate. In diagram 595, temperature profile 562 presents a state during the initial heating of the substrate via a 0%:100% first to second coil power allocation, where the heating occurs primarily in the middle region 583. In diagram 600, temperature profile 602 presents a state during the initial heating of the substrate via a 50%:50% front to back power allocation, where the heating occurs along the front region 502 and the back region 504, but primarily in the middle region 583.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An emission control system comprising:
   an emission control device having a plurality of passages to facilitate emission control of a vehicle engine, the emission control device having a substrate and pins of a plurality of differing lengths;
   a controller, that generates a control signal to initiate induction heating of the emission control device; and
   an electromagnetic field generator that responds to the control signal by generating a power signal applied to one or more coils to cause the induction heating of the pins of the emission control device, wherein the plurality of differing lengths of the pins cause a first region of the emission control device to heat faster than a second region of the emission control device.

2. The emission control system of claim 1, wherein the first region of the emission control device reaches magnetic saturation before the second region of the emission control device.

3. The emission control system of claim 2, wherein a frequency of the power signal is adjusted to control a location of heating within the emission control device between the first region of the emission control device and the second region of the emission control device.

4. The emission control system of claim 3, wherein the frequency of the power signal is adjusted from a first frequency before the first region of the emission control device reaches the magnetic saturation to a second frequency after the first region of the emission control device reaches the magnetic saturation.

5. The emission control system of claim 3, wherein the second frequency of the power signal drives the second region of the emission control device to magnetic saturation after the first region of the emission control device reaches the magnetic saturation.

6. An emission control system comprising:
   an emission control device having a plurality of passages to facilitate emission control of a vehicle engine;
   a controller, that generates a control signal to initiate induction heating of the emission control device; and
   an electromagnetic field generator that responds to the control signal by generating at least one power signal that is applied to a plurality of coils to cause the induction heating of the emission control device, wherein the at least one power signal is generated to selectively allocate a total power among each of the plurality coils.

7. The emission control system of claim 6, wherein the emission control device has a substrate and pins of a plurality of differing lengths, the induction heating of the emission control device includes inductively heating the pins via the electromagnetic field generator.

8. The emission control system of claim 6, wherein the plurality of coils includes a first coil having a first resonant frequency and a second coil having a second resonant frequency and the at least one power signal is generated to have a power signal frequency corresponding to the first resonant frequency and wherein the power signal frequency differs from the second resonant frequency.

9. The emission control system of claim 6, wherein the plurality of coils is arranged at differing locations along the emission control device.

10. The emission control system of claim 6, wherein the plurality of coils includes a first coil arranged at a first location along the emission control device and a second coil arranged at a subset of the first location.

11. The emission control system of claim 10, wherein the at least one power signal is selectively generated as:
    a first power signal that selectively allocates the total power to the first coil;
    a second power signal that selectively allocates the total power to the second coil; and
    a third power signal and a fourth power signal that selectively allocates the total power by splitting the total power between the first coil and the second coil.

12. The emission control system of claim 6, wherein the plurality of coils includes a first coil arranged at a first location along the emission control device and a second coil arranged at a second location that is separate from the first location.

13. The emission control system of claim 12, wherein the at least one power signal is selectively generated as:
    a first power signal that selectively allocates the total power to the first coil;
    a second power signal that selectively allocates the total power to the second coil; and a third power signal and a fourth power signal that selectively allocates the total power by splitting the total power between the first coil and the second coil.

\* \* \* \* \*